United States Patent [19]
Roth

[11] 3,922,251
[45] Nov. 25, 1975

[54] NOVEL SULFANILAMIDE-ALDEHYDE COPOLYMER

[75] Inventor: Shirley H. Roth, Highland Park, N.J.

[73] Assignee: Cities Service Oil Company, Tulsa, Okla.

[22] Filed: June 19, 1974

[21] Appl. No.: 480,893

Related U.S. Application Data

[63] Continuation-in-part of Ser. No. 291,847, Sept. 25, 1972, abandoned.

[52] U.S. Cl. ......... 260/72.5; 260/30.2; 260/30.4 N; 260/30.8 DS; 260/32.6 N
[51] Int. Cl.² ......................................... C08G 12/08
[58] Field of Search ................................ 260/72.5

[56] References Cited
OTHER PUBLICATIONS

Chem. Abstracts, Vol. 42, 1948, 6577c, Kuwata et al.
Chem. Abstracts, Vol. 50, 1956, 7856h, Camps.
Chem. Abstracts, Vol. 45, 1951, 7974a–c, Fujiwara.
Chem. Abstracts, Vol. 48, 1954, 10368a–c, Badische Aniline.
Chem. Abstracts, Vol. 54, 1960, 5089a–5090a–b, Briggs.
Chem. Abstracts, Vol. 45, 1951, 3510h–i, Fujiwara.
Chem. Abstracts, Vol. 45, 1951, 5650c–e, Fujiwara.
J. Med. Chem., Vol. 10, 1967, pp. 963–964, Dombroski et al.

*Primary Examiner*—Howard E. Schain
*Attorney, Agent, or Firm*—Patricia J. Hogan

[57] ABSTRACT

The novel copolymers of the invention are low molecular weight, water-insoluble, organic solvent-soluble amine-aldehyde copolymers having the repeating unit:

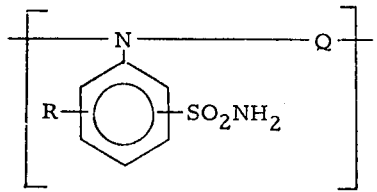

wherein Q is the aldehyde residue and R is hydrogen, alkyl, haloalkyl, alkoxy, haloalkoxy, halo, nitro, acetamido, or sulfonamido. According to a preferred embodiment of the invention, the copolymers are sulfanilamide-formaldehyde copolymers having such repeating units.

6 Claims, No Drawings

NOVEL SULFANILAMIDE-ALDEHYDE COPOLYMER

CROSS-REFERENCE TO RELATED APPLICATION

This application is a continuation-in-part of copending application Ser. No. 291,847, filed Sept. 25, 1972, now abandoned.

BACKGROUND OF THE INVENTION

1. Field of the Invention

This invention relates to amine-aldehyde copolymers and more particularly relates to such copolymers containing a sulfanilamide-type compound as the amine.

2. Description of the Prior Art

It is known that amines may be condensed with aldehydes to form copolymers, the most common of which are urea-formaldehyde and melamine-formaldehyde. It is also known that sulfanilamide-type compounds may be used as the amines for the condensation reaction and that the aldehyde copolymers prepared therefrom are water-soluble, organic solvent-insoluble, and/or characterized by containing units wherein the aldehyde residues are bonded to the sulfanilamide-type residues by the abstraction from the sulfanilamide-type compound of hydrogens other than or in addition to the hydrogens of the amino group.

SUMMARY OF THE INVENTION

An object of this invention is to provide novel copolymers of a sulfanilamide-type amine and an aldehyde.

Another object is to provide such copolymers wherein the sulfanilamide-type residues are bonded to the aldehyde residues through the nitrogen of the amino group.

A further object is to provide such copolymers which are water-insoluble and soluble in organic solvents.

These and other objects are attained by reacting with an aldehyde in a liquid medium at an apparent pH of about 3–9 and a temperature of about 0°–50°C. an amine corresponding to the formula:

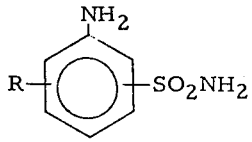

wherein R is hydrogen, alkyl, haloalkyl, alkoxy, haloalkoxy, halo, nitro, acetamido, or sulfonamido. The product of the reaction is an amine-aldehyde copolymer which has a number average molecular weight of about 350–2000 and which consists essentially of repeating units corresponding to the formula:

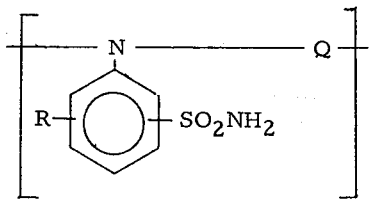

wherein Q is the aldehyde residue.

DESCRIPTION OF THE PREFERRED EMBODIMENTS

As indicated by the above formulas, the amine of the invention is a sulfanilamide-type compound, i.e., a substituted or unsubstituted o-, m-, or p-aminobenzenesulfonamide. When the sulfanilamide-type compound bears an organic substituent, it is preferred that the substituent contain 1–5 carbon atoms. When halo substituents are present, it is preferred that they be chloro or bromo. Exemplary of these amines are sulfanilamide, o-amino-benzenesulfonamide, m-aminobenzenesulfonamide, 4-amino-2-ethylbenzenesulfonamide, 2-amino-3-chloromethylbenzenesulfonamide, 3-amino-2-butoxybenzenesulfonamide, 4-amino-3-bromomethoxybenzenesulfonamide, 4-amino-2-chlorobenzenesulfonamide, 2-amino-4-bromobenzenesulfonamide, 4-amino-2-nitrobenzenesulfonamide, 4-amino-2-acetamidobenzenesulfonamide, 4-amino-1,3-disulfonamidobenzene, etc., and mixtures thereof. The preferred amine of this type is sulfanilamide.

The aldehyde which is condensed with the amine in the practice of the invention may be saturated or unsaturated and may be aliphatic, alicyclic, or aromatic. Exemplary of these aldehydes are formaldehyde, acetaldehyde, propionaldehyde, butyraldehyde, pentaldehyde, hexaldehyde, octaldehyde, benzaldehyde, furfural, acrolein, methacrolein, crotonaldehyde, cinnamaldehyde, etc., and mixtures thereof. The mol ratio of aldehyde to amine in the reaction mixture may vary from about 0.5–5/1, preferably about 0.9–5/1. Only about 0.5–1 (usually about 1) molar proportion of the aldehyde actually reacts with the amine, but an excess of aldehyde is sometimes desirable to force the reaction to completion.

The reaction is conducted with agitation in a liquid medium at an apparent pH of about 3–9, preferably about 3–7, most preferably about 3.5–6. When the liquid medium is water, the reaction is conducted in dispersion, e.g., in an aqueous slurry, emulsion, or suspension. When the liquid medium is an organic solvent, the reaction is conducted in solution. Ordinarily, the amount of liquid medium employed is such as to provide at least about 1 cc. of medium per gram of amine.

The reaction is conducted at a temperature in the range of about 0°–50°C., preferably about room temperature, and may be completed in a matter of seconds. Ordinarily, however, the reaction conditions are maintained for about 1–60 minutes and may be maintained for even longer periods, e.g., up to 3 hours, without ill effect.

Since the reaction is so rapid, a catalyst is normally unnecessary. However, if desired, a catalyst may be used. Suitable catalysts include salts of metals that form complexes with amines, e.g., zinc, lead, cadmium, etc., especially zinc chloride.

When a non-aqueous liquid medium is employed, it may be any suitable solvent, such as acetone, dimethylformamide, dimethylsulfoxide, 2-methoxyethanol, dioxane, tetrahydrofuran, etc. When the reaction is conducted in aqueous suspension, the reaction mixture contains a suspending agent, preferably a non-ionic suspending agent, such as polyvinyl alcohol. During or after the reaction, the product may be modified by the incorporation of additives, such as pigments, dyes, fillers, plasticizers, stabilizers, etc.

The products of the invention are novel amine-aldehyde copolymers having number average molecular weights of about 350–2000 and consisting essentially of repeating units corresponding to the formula:

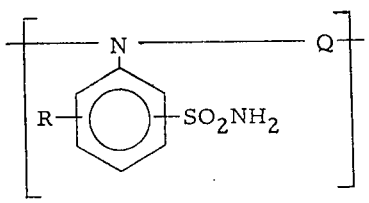

In these copolymers, as already mentioned, Q is the aldehyde residue, e.g., H - C - H in the case of a formaldehyde residue, H - C -CH$_3$ in the case of an acetaldehyde residue, H - C - O in the case of a benzaldehyde residue, H - C - CH =CH$_2$ in the case of an acrolein residue, etc.

The amine/aldehyde mol ratio in the copolymers is about 1:1 but may vary from this exact figure, and the nature of the terminal groups naturally varies with the particular mol ratio. Thus, the copolymers may be amine-terminated, as in the case of:

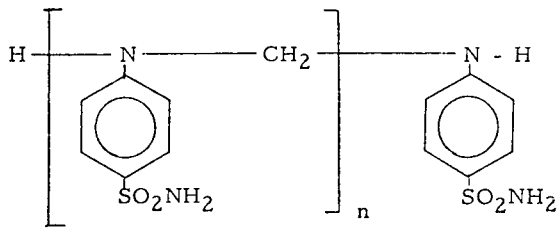

hydroxyl-terminated, as in the case of:

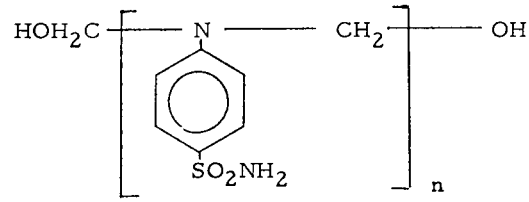

or amine-hydroxyl-terminated, as in the case of:

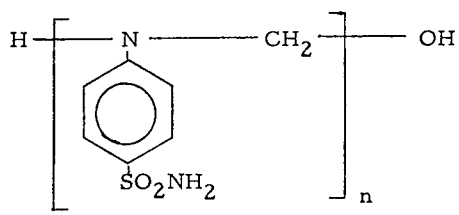

The copolymers are water-insoluble and soluble in common organic solvents, such as acetone, dimethylformamide, dimethylsulfoxide, 2-methoxyethanol, dioxane, tetrahydrofuran, etc. They are useful as dye intermediates, are also useful for the same applications as comparable amine-aldehyde interpolymers of the prior art, and are particularly useful in intumescent coating compositions.

The following examples are given to illustrate the invention and are not intended as a limitation thereof.

EXAMPLE I

Over a period of about 0.5–1 minute, add 224 cc. of 37% formaldehyde solution to an agitated slurry of 500 g. of sulfanilamide in 1735 cc. of water. Continue agitating the reaction mixture for 60 minutes and vacuum filter it. Wash the powdery reaction product with water and air dry it. Analysis shows the product to be a sulfanilamide-formaldehyde copolymer which has a number average molecular weight in the range of about 350–2000 and which consists essentially of repeating units corresponding to the formula:

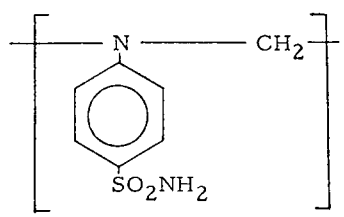

EXAMPLE II

Over a period of about 1 minute, add 249.5 cc. of 37% formaldehyde solution to an agitated slurry of 500 g. of sulfanilamide in 1735 cc. of water. Continue agitating the reaction mixture for 25 minutes and vacuum filter it. Wash the powdery reaction product with water and dry it under vacuum. Analysis shows the product to be similar to that of Example I.

EXAMPLE III

Stir 0.26 g. of polyvinyl alcohol into 500 cc. of water. Add 86.1 g. of sulfanilamide to form a suspension. To the agitated suspension add increments of 43 cc. of a 37% formaldehyde solution over a period of one hour. Continue agitating the suspension for an additional hour, filter, wash, and dry. Analysis shows the product to be similar to that of Example I.

EXAMPLE IV

Dissolve 1.7 g. of zinc chloride in 300 cc. of water, add 86.1 g. of sulfanilamide, and agitate the slurry for 10 minutes. Then add 43 cc. of 37% formaldehyde solution over a period of about one minute. Separate the agglomerate thus formed, break it up, wash, and dry. Analysis of the product shows it to be similar to that of Example I except for containing 0.018% by weight of zinc.

Similar results are observed when the examples are repeated except that the sulfanilamide and formaldehyde are replaced by the materials taught to be their equivalents in the specification.

It is obvious that many variations may be made in the products and processes set forth above without departing from the spirit and scope of this invention.

What is claimed is:

1. A water-insoluble amine-aldehyde copolymer having a number average molecular weight of about 350–2000 and consisting essentially of repeating units corresponding to the formula:

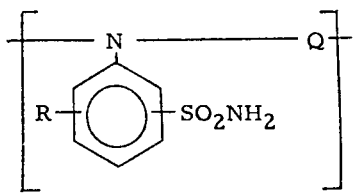

wherein Q is the aldehyde residue and R is hydrogen, alkyl, haloalkyl, alkoxy, haloalkoxy, halo, nitro, acetamido, or sulfonamido.

2. The copolymer of claim 1 wherein R is hydrogen.

3. The copolymer of claim 2 wherein the amine portion of the repeating unit corresponds to the formula:

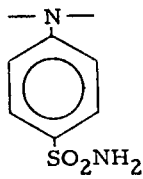

4. The copolymer of claim 1 wherein Q is the residue of an alkanal containing 1–5 carbon atoms.

5. The copolymer of claim 4 wherein the alkanal is formaldehyde.

6. The copolymer of claim 1 wherein the repeating units correspond to the formula:

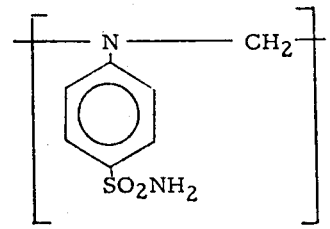

* * * * *

PO-1050
(5/69)

UNITED STATES PATENT OFFICE
CERTIFICATE OF CORRECTION

Patent No. 3,922,251      Dated Nov. 25, 1975

Inventor(s) Shirley H. Roth

It is certified that error appears in the above-identified patent and that said Letters Patent are hereby corrected as shown below:

On page 1, left hand column, line 4, the name of the assignee should read --Cities Service Company--. Column 3, line 15, the formula reading "H-C-H" should read--
$$H-\underset{|}{\overset{|}{C}}-H$$
--; line 16, the formula reading "H-C-CH$_3$" should read--
$$H-\underset{|}{\overset{|}{C}}-CH_3$$
--; line 17, the formula reading "H-C-O" should read --
$$H-\underset{|}{\overset{|}{C}}-\emptyset$$
--; line 18, the formula reading "H-C-CH=CH$_2$" should read--
$$H-\underset{|}{\overset{|}{C}}-CH=CH_2$$
--.

Signed and Sealed this twenty-third Day of March 1976

[SEAL]

Attest:

RUTH C. MASON
*Attesting Officer*

C. MARSHALL DANN
*Commissioner of Patents and Trademarks*